United States Patent [19]
Allaire et al.

[11] Patent Number: 5,049,329
[45] Date of Patent: Sep. 17, 1991

[54] PROCESS FOR FORMING CERAMIC MATRIX COMPOSITES

[75] Inventors: Roger A. Allaire; Frank Coppola, both of Big Flats, N.Y.

[73] Assignee: Corning Incorporated, Corning, N.Y.

[21] Appl. No.: 428,983

[22] Filed: Oct. 30, 1989

[51] Int. Cl.⁵ .............................................. C04B 35/80
[52] U.S. Cl. .................................... 264/60; 264/62; 264/332
[58] Field of Search ................ 264/332, 570, 60, 62

[56] References Cited

U.S. PATENT DOCUMENTS

| | | | |
|---|---|---|---|
| 4,112,143 | 9/1978 | Adlerborn et al. | 429/191 |
| 4,339,271 | 7/1982 | Isaksson et al. | 75/223 |
| 4,464,475 | 8/1984 | Chyung et al. | 501/9 |
| 4,601,877 | 7/1986 | Fujii | 264/332 |
| 4,615,987 | 10/1986 | Chyung et al. | 501/8 |
| 4,652,413 | 3/1987 | Tiegs | 264/570 |
| 4,656,002 | 4/1987 | Lizenby | 264/570 |
| 4,755,489 | 7/1988 | Chyung et al. | 501/8 |
| 4,764,195 | 8/1988 | Allaire et al. | 65/18.4 |
| 4,960,550 | 10/1990 | Wright | 264/56 |

*Primary Examiner*—James Derrington
*Attorney, Agent, or Firm*—K. van der Sterre

[57] ABSTRACT

In the method for making a ceramic matrix composite article comprising the steps of providing a porous preform for the article formed of a combination of a fibrous reinforcing material and a ceramic matrix material, and thereafter consolidating the preform by the application of heat and consolidation pressure thereto, improved consolidation of preforms of curved or other complex configuration is achieved by applying consolidation pressure to the preforms through the medium of a softened glass.

11 Claims, 2 Drawing Sheets

PROCESS FOR FORMING CERAMIC MATRIX COMPOSITES

BACKGROUND OF THE INVENTION

The present invention relates to the manufacture of ceramic matrix composite products, and more particularly to an improved method for consolidating such composites to provide products of high density and strength.

Ceramic matrix composites may be characterized as composites wherein a ceramic matrix material such as a glass, glass-ceramic or crystalline ceramic is reinforced by the inclusion of inorganic fibers or whiskers. The reinforcement may consist of long fibers, short or chopped fibers, or whiskers, these being typically composed of silicon carbide, mullite, alumina or other material available in fiber or whisker form.

Ceramic composite materials are of interest because they exhibit higher strength and toughness than ordinary ceramic materials. Thus they are less prone to sudden catastrophic brittle failure than conventional ceramics.

Ceramic matrix composites are customarily fabricated by combining the selected reinforcing fiber material with finely divided fibrous or powdered glass or other ceramic material. The combination of fibers and ceramics, normally in the form of a unitary porous preform, is then consolidated with heat and pressure. In order to realize the potential high strength and toughness of these materials, consolidation must be complete, ħe., very few voids or defects should remain in the consolidated material. This requires the application of substantial heat and pressure to the powdered ceramic, utilizing temperatures well above those required for the processing of organic or metallic materials.

Hot pressing has been the process of choice for the fabrication of fiber-reinforced ceramic matrix composites because it is capable of applying unidirectional pressures greater than 1000 psi at temperatures above 1000° C. This is the forming regime in which most composites comprising glass or glass-ceramic matrix materials must be consolidated. U.S. Pat. No. 4,764,195, for example, describes some of the processing parameters to be observed in the processing of glass-matrix composites. However, while hot pressing has served well for the initial feasibility evaluations of these materials, there is a clear need to develop forming methods adaptable to the formation of more complex shapes in fiber-reinforced ceramic composites.

It is well known that relatively small ceramic parts can be formed from cold-pressed powder preforms of near net shape by hot isostatic pressing. U.S. Pat. Nos. 4,339,271 and 4,112,143, for example, describe processes wherein such parts are simply coated with powders of one or more fusible glass or metallic materials, and then finally consolidated, after fusion of the fusible powder coating into a gas barrier, by the application of heat and pressure to the coated compacts. Unfortunately this method cannot be used with larger unpressed parts such as ceramic matrix composite preforms. The high incidence of pinholes in the powder coatings, which effectively prevent consolidation of the part, makes large part fabrication by this method totally impracticable. In addition, the risk of part distortion, due to the larger preform sizes and relatively high degree of preform compaction required, is considerable.

Ceramic matrix composites can be classified into two different categories, depending upon the viscosity at which consolidation is most preferably carried out. In the low viscosity regime are most glass matrix composites. These are typically consolidated at temperatures near the working point viscosity of the matrix glass, e.g., $10^3$–$10^4$ poises.

In the high viscosity consolidation regime are composites comprising glass-ceramic matrix materials. Due to the thermal crystallization behavior of these materials, they are more typically consolidated at viscosities of $10^7$–$10^{12}$ poises, viscosities which are near the softening point of the glasses prior to crystallization. It should be noted that, although the processing concepts in these two regimes are similar, the consolidation mechanics are significantly different.

A critical consideration to be addressed in the processing of these composites is the very high degree of debulking which must be achieved. Typical preforms for ceramic matrix composites are about 25% dense, i.e., they occupy four times the volume which the fully densified ceramic composite will occupy after consolidation is completed. Accordingly, for any complex shape, there is a likelihood that a great deal of fiber realignment, inter-ply slippage or the like will occur during consolidation as the fibers are compelled to conform to the surfaces of the consolidation molds. For this reason the consolidation of complex shapes requires the careful design of the consolidation process and equipment, as well as the design of the preform, in order that the reinforcing fibers not be placed in compression to cause fiber buckling or ply wrinkling.

It is a principal object of the present invention to provide an improved consolidation process for the manufacture of ceramic matrix composites which addresses some of the aforementioned difficulties.

It is a further object of the invention to provide a consolidation process which will permit the consolidation of composites of complex shape at high temperatures and pressures.

Other objects and advantages of the invention will become apparent from the following description thereof.

SUMMARY OF THE INVENTION

The present invention is based in part on the fact that, in order to minimize fiber buckling and/or ply wrinkling during the consolidation of complex preforms, the forming pressures used for consolidation must be applied to the preform principally in directions normal to the preform surface. These directions are typically directions normal to the prevailing directions of the reinforcing fibers also, such that the extent of fiber movement parallel to the axes of the fibers during consolidation is reduced.

The application of appropriate forming pressures in accordance with the invention is achieved through the use of a plastic or liquid pressurizing medium which is a softened glass. This medium is positioned between the composite preform and the source of consolidation force required to achieve the necessary consolidation, and permits uniform hydraulic pressure to be applied to the preform. The glass pressurizing medium may, for example, comprise a glass diaphragm or membrane positioned between the preform and a source of consolidation force such as compressed gas, or it may be a body of pressurizing fluid which is a softened glass to which consolidation force is applied by mechanical means.

In one aspect, then, the invention includes a modification of the conventional method for making ceramic matrix composite articles. Conventionally, such products are made by the steps of first providing a porous preform for the article, the preform comprising a combination of a fibrous reinforcing material and a ceramic matrix material, and thereafter consolidating the porous preform by the application of heat and consolidation pressure thereto.

In accordance with the present invention, the consolidation step is characterized in that the consolidation pressure is applied to the porous preform through the medium of a softened glass. The softened glass may be in the form of a softened glass diaphragm or a body of fluid glass as above described, and may transmit consolidation pressure, directly or indirectly, to all or only a portion of the exterior surface of the composite preform. By softened glass is simply meant glass at a temperature above its annealing temperature, preferably at or above its softening temperature, such that it can serve as an effective deformable or fluid medium for the transmission of applied pressure from an external source of consolidation force.

To guard against unwanted shape deformation of the preform during debulking and consolidation under the pressure of the softened glass, it is important that support for the preform against the consolidation pressure generated by the softened glass be provided. Generally this support will be provided by solid supporting means, most typically a rigid shaping surface for the preform, such as a mold surface. This surface will be in direct or indirect supporting contact with the preform, in effect providing an opposing force countering the consolidation force applied to the preform by the softened glass.

Softened glass provides two important functions in the consolidation process contemplated by the present invention. First, as a fluid but yet relatively high viscosity medium, it can effectively serve as a membrane or barrier preventing the intrusion into the preform of gases or other contaminants which could adversely affect composite properties. Secondly, when utilized in the form of a body of pressurizing liquid wholly or partially encasing the preform, it permits the uniform application of high pressure to complex composite shapes without undergoing volume compression in the manner of gaseous pressurizing media.

Particularly in the latter case, high viscosity in the glass pressurizing medium imparts a substantial advantage in terms of the reduced tolerance levels needed for tooling or other apparatus intended to confine the pressure medium during consolidation. In addition, the incompressibility of softened glass as a pressure medium reduces the work of consolidation, and therefore reduces the cost and enhances the safety of the apparatus required for composite preform consolidation processing.

DESCRIPTION OF THE DRAWINGS

The invention may be further understood by reference to the drawing wherein.

DETAILED DESCRIPTION

Figure 1:
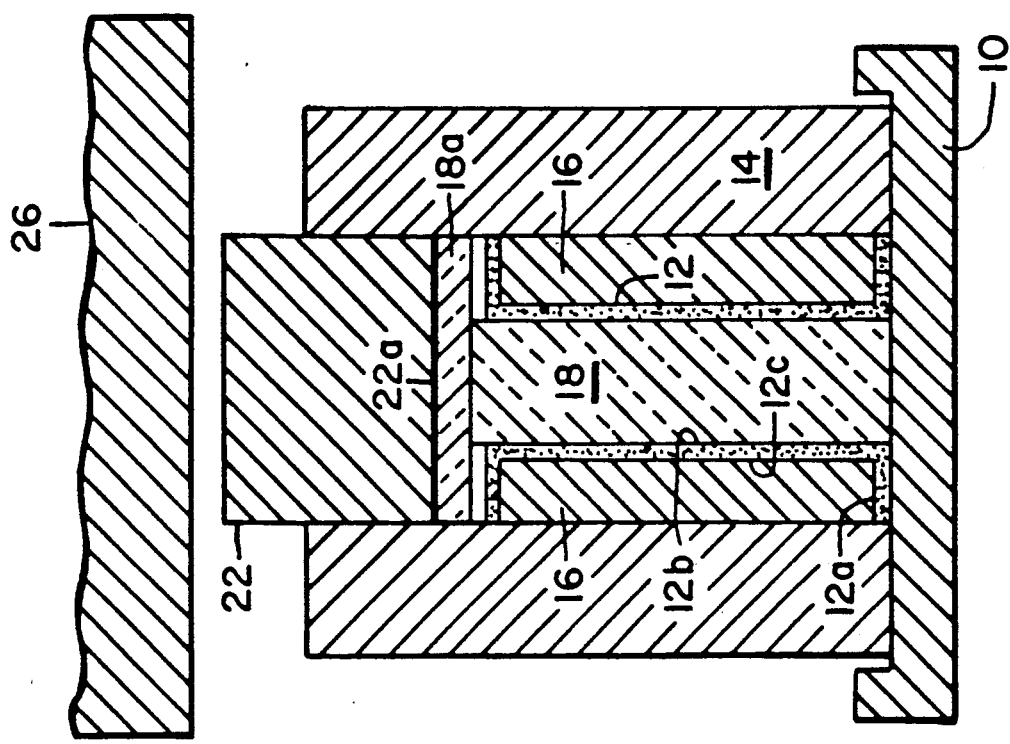
FIG. 1 is a schematic cross-sectional elevational view of apparatus for composite consolidation employing a glass pressure diaphragm.

As will be evident from the following description, the process of the invention is not limited to any specific type of preform for a ceramic matrix composite article, but rather may be adapted to the consolidation of a wide variety of preform types and configurations. Thus the preform can comprise essentially any unitary combination of ceramic matrix material and reinforcing fiber requiring consolidation to increase the density or reduce the porosity thereof, including combinations of these structural materials with organic or inorganic binder constituents, dry compacts of fibers and ceramic materials, or any other convenient assembly of the desired structural materials.

The ceramic matrix material most often present in conventional composite preforms is a fine particulate or powdered material, although other forms such as fibers or woven cloth of the selected matrix material have also been used. In the case of glass or glass-ceramic matrix materials, these are generally produced by converting a softened glass to a glass frit and then milling or otherwise processing the glass frit to form fine glass powders. Conventional particulate ceramics, whether of oxide composition or comprised of other sinterable inorganic carbides, borides, nitrides or other compounds, can simply be milled by known processes if necessary to achieve particle sizes appropriate for composite preform manufacture.

Conveniently, long reinforcing fibers may be combined with ceramic powders produced in this manner by coating the fibers with liquid suspensions of the powders. Short fibers or whiskers may simply be dispersed with the powders in liquid suspension, or drymixed. Coated long fibers may be laid up to provide wound or woven "prepregs" wherein the powder is disposed throughout the fiber structure. Short fiber or whisker dispersions in powdered matrix materials may be cast or otherwise shaped before or after the removal of any liquid vehicle components therefrom.

A composite preform thus provided, if having a composition which includes organic vehicle or binder constituents, may in some cases advantageously be subjected to a burnout process involving heating to remove the residual organic materials therefrom. The resulting porous preform, comprising only the matrix material and fibers, is then ready for consolidation.

Of course, the present invention is applicable to the consolidation of ceramic matrix composite preforms without particular regard for the composition of the fibers or matrix materials utilized for preform manufacture. In the case of the fibers, for example, while silicon carbide fibers, most frequently Nicalon[R] silicon carbide or oxycarbide fibers are frequently used for the manufacture of high-use-temperature composites, other types of fibers or whiskers, including fibers, chopped fibers or whiskers of carbon, alumina, B4C, BN, zircon, mullite, spinel or silicon nitride, may also be used.

Similarly, a wide variety of different ceramic matrix compositions are amenable to consolidation in accordance with the process of the present invention. While the presently preferred matrix materials comprise alkali borosilicate glasses, alkaline earth aluminosilicate glasses, and alkaline earth aluminosilicate glass-ceramics, it will be appreciated that alternative glasses, glass-ceramics, and conventional ceramics may also be satisfactorily consolidated.

Representative of useful prior art matrix materials are anorthite-containing glass-ceramics such as disclosed in U.S. Pat. No. 4,615,987, anorthite/alumina or anorthite/mullite glass-ceramics such as disclosed in U.S. Pat. No. 4,755,489, and barium osumilite- or cordierite-containing glass-ceramics such as disclosed in U.S. Pat. No. 4,464,475. Useful aluminosilicate glasses include $RO-Al_2O_3-SiO_2$ glasses wherein RO consists of one or more oxides selected from the group consisting of CaO, MgO, SrO and BaO, and which are most preferably substantially free of alkali metal oxides such as $Na_2O$, $Li_2O$, and $K_2O$.

In the manufacture of composite ceramics comprising glass-ceramic matrix materials such as shown in the aforementioned patents, while the matrix material is normally introduced into the preform and consolidated in the form of a glass precursor for the glass-ceramic matrix, conversion to the desired glass-ceramic phase is ultimately required. In the method of the present invention this conversion or crystallization step can also be carried out under pressure from a softened glass envelope or other charge of glass, if desired.

Utilizing a glass diaphragm to transmit consolidation pressure to a composite preform achieves not only the desired application of consolidation force normal to the surface of the preform, but in addition prevents the intrusion of the force medium applying the pressure, e.g., a gas or liquid pressure medium, into the unconsolidated pore structure thereof. Thus a gas tight, flexible membrane at the consolidation temperature is provided. Of course, due to the high consolidation temperatures employed, typically in the range of 500°-1500° C., the diaphragm must not only be deformable without excessive flow at the selected consolidation temperature, but also chemically stable at that temperature.

In cases where the glass viscosity is sufficiently low during consolidation to risk intrusion into the pore structure of the preform, an auxiliary diaphragm material, which need not be gas-impermeable, may be employed. Examples of such materials include molybdenum foil and graphite paper.

The following example describes in more detail the use of glass diaphragm consolidation in accordance with the invention.

EXAMPLE I

A composite preform comprising graphite fibers and a powdered glass matrix material is first prepared. The graphite fibers used to provide the preform are commercially available as Hercules AU-4 graphite fibers in the form of fiber tows with a fiber count of approximately 12,000 fibers per tow.

The fiber tow material is first impregnated with a glass matrix material by immersion of the tow in a slurry of the glass in powder form. The matrix glass consists of a borosilicate glass commercially available as Corning Code 8830 glass. That glass has a composition of about 64.6% $SiO_2$, 7.3% $Na_2O$, 23.4% $B_2O_3$, and 4.7% $Al_2O_3$, and is prepared by milling to a glass powder having an average particle size below 10 microns. An aqueous vehicle comprising a polyvinyl acetate binder and a surface-active dispersant is then prepared and the powdered glass is added to the vehicle to provide a flowable slurry.

Following immersion in the slurry the fiber tow is removed and dried. The dried glass-impregnated tow is then laid up into a preform of a desired shape by braiding multiple tow strands onto a 1-inch mandrel to provide a braided tube preform of having a diameter of approximately 1 inch and a length of approximately 2 inches.

To consolidate the tubular preform made as described, mold tooling and a glass envelope member of suitable dimensions are first provided. FIG. 1 of the drawing illustrates a tooling assembly such as used for the consolidation. As shown in FIG. 1, the tooling comprises a cylindrical mold body 12 constructed of graphite which is positioned on a graphite mold base 14. Situated within cylindrical mold body 12 is the composite preform 16, and placed interiorly of the preform 16 is a flanged glass envelope 18 the sidewall of which will act as a glass pressure diaphragm during subsequent preform consolidation. Envelope 18 includes flange 18a to provide a pressure seal as hereinafter described.

Also provided in the assembly is a release layer of molybdenum foil 20, interposed between the glass envelope 18 and the preform 16, to facilitate subsequent release of the envelope from the consolidated composite produced from the preform. The envelope is formed of Corning Code 7740 borosilicate glass, that glass being commercially available from Corning Incorporated, Corning, N.Y.

The mold tooling assembly further comprises a plunger member 30 positioned above the mold which is adapted to move down into contact with the mold body 12, and into sealing contact with the flange 18a on glass envelope 18. The plunger includes a gas head 32 comprising gas conduit 34 for conducting a gas under pressure from an external gas source into the interior of envelope 18. When admitted, the pressurized gas acts to apply uniform force to the interior of the glass envelope 18, that force being transmitted via the envelope sidewall as consolidation pressure to the composite preform 16.

Consolidation of the preform utilizing the tooling thus provided is most conveniently achieved using a conventional two-zone consolidation furnace having atmosphere control to provide a neutral, e.g., nitrogen, atmosphere within the furnace during the consolidation process. To consolidate the preform, the mold assembly as shown is first positioned in the low temperature zone of the furnace for initial preheating to approximately 450° C. Carried out over a period of about two hours, this preheating also effects removal of the slurry binder constituents from the tube wall without undesirably affecting the properties of the carbon fibers.

Following preheating, the mold assembly is moved to the hot zone of the furnace and heated under nitrogen to a temperature of approximately 1000° C., this heating being for a time sufficient to achieve thermal equilibrium of the mold components and preform. The heated assembly is then returned to the low temperature zone of the furnace and the hydraulic ram assembly is lowered into contact with the mold to apply pressure to the now softened glass diaphragm flange 18a. The ram pressure applied to the flange is sufficient to provide a gas-tight seal over the glass envelope.

After a seal has been obtained, nitrogen is introduced at a pressure of 200 psi through gas conduit 34 into the interior of glass envelope 18. The viscosity of the heated glass envelope at this point is on the order of $10^4$ poises, such that the sidewall of the glass envelope is readily deformed by the applied gas pressure and applies a corresponding pressure against the interior surface of the porous preform. This pressure achieves substantially complete consolidation of the preform before the assembly has cooled to a point where the viscosity of the glass interferes with the transmission of consolidation force to the preform.

Following consolidation of the composite material as described, the plunger is withdrawn and the mold assembly is removed from the furnace. The consolidated composite with adhering glass pressure membrane and release material is then removed from the mold cylinder, and the glass membrane and separation layer are broken away from the consolidated composite. Examination of the composite indicates that consolidation of the tubular preform to high density by the described process is achieved.

Although not required in all cases, it may be desirable to use additional sealing material adjacent the glass flange 18a in the assembly of FIG. 1, to improve sealing characteristics and/or to avoid quenching of the seal. Refractory fibrous materials, including for example a gasket or other sealing element composed of the prepreg material being processed, can provide suitable supplemental sealing when placed in contact with the flange.

While the process of the foregoing example demonstrates the effectiveness of a glass diaphragm in consolidating a curved ceramic composite of relatively simple shape, it will be appreciated that much more complicated envelope designs would be required for preforms of more complex configuration. A further consideration with the use of gas pressurization as above described is that a substantial amount of energy is stored in the pressurized gas. Thus in the event of a tooling failure, significant energy release by the compressed gas can occur.

Safer and more controlled pressure consolidation of complex shapes in accordance with the invention is provided utilizing hot glass hydrostatic pressure forming. In this method, hydrostatic pressure replaces the pressure generated by gas in the prior example, with the preferred pressurizing medium being softened glass.

The softened glass pressurizing medium can be used alone or with a supplemental glass pressure membrane if desired, i.e., a low-melting softened glass can simply replace the high pressure gas in the apparatus of Example I above. For most applications however, only a single softened glass for both pressurization and envelopment of the preform is needed.

A further advantage of hydrostatic pressure forming is that gas-tight tooling is no longer required, since the pressurizing medium is a viscous fluid. Moreover, the fluidity of the medium insures that uniaxial force applied to the medium by mechanical means such as a plunger is readily transmitted by the medium to the composite preform as high multi-axial or isostatic consolidation pressure.

Thus pressures on the order of 1000 psi at the preform surface can readily be generated.

The consolidation of a ceramic matrix composite preform by a process utilizing a pressurizing fluid consisting of a body of softened glass is more fully illustrated by the following example.

EXAMPLE II

A preform comprising a braided cylindrical tube prepared from glass-impregnated carbon reinforcing fibers is fabricated as described in Example I. However, the structure of the preform is modified such that it integrally incorporates opposing end extensions consisting of flanges of glass-impregnated fibers woven into the cylindrical body of the braided tube, as shown in FIG. 2 of the drawing and hereinafter described.

To achieve consolidation of this flanged composite preform, the preform is first positioned in consolidation apparatus similar to that utilized in Example I, but adapted to contain softened glass under pressure. Apparatus suitable for the purpose is schematically illustrated in FIG. 2 of the drawing.

Figure 2:
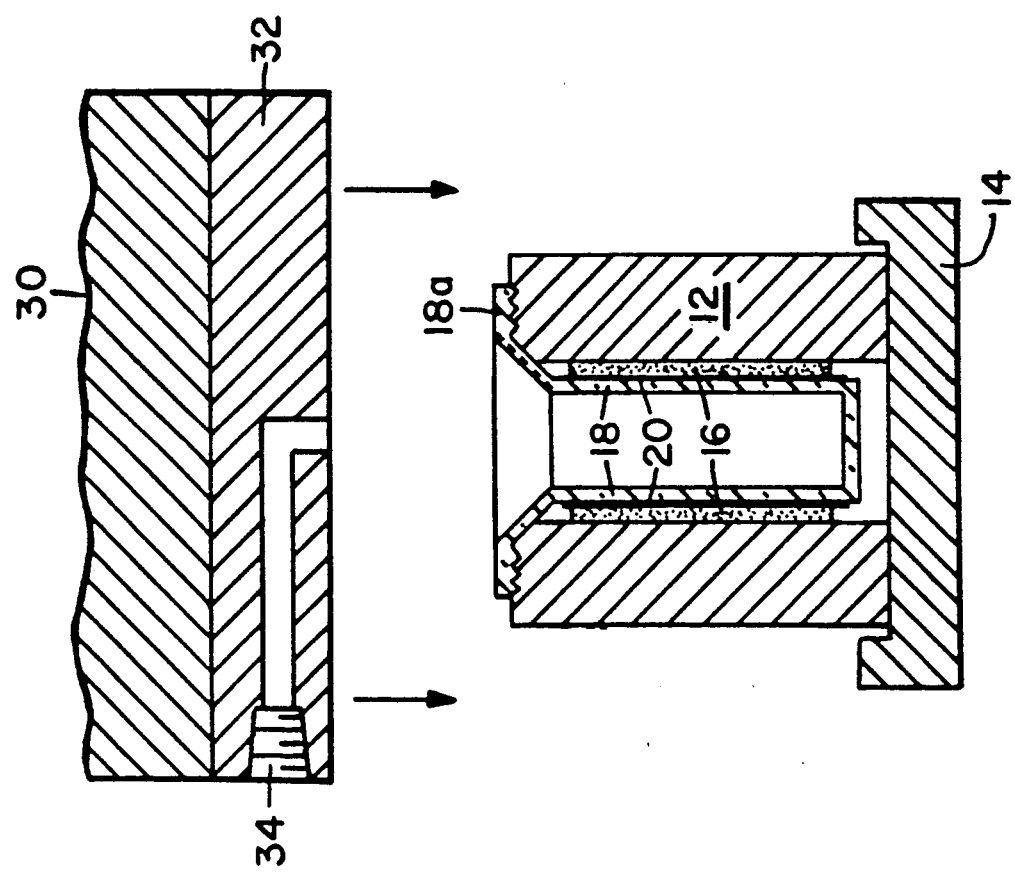
FIG. 2 is a schematic cross-sectional elevational view of apparatus for composite consolidation using softened glass as a hydrostatic pressurizing medium.

As shown in FIG. 2, a carbon base platen 10 is provided for the support of the braided composite preform 12 and a surrounding hollow cylindrical graphite mold 14. Preform 12 includes integral flanges 12a which are also to be consolidated. Positioned within the graphite mold 14 but exteriorly of the preform is a split liner 16 composed of carbon and having a hollow cylindrical shape when assembled. The inside cylindrical and opposing end surfaces of split liner 16 are configured to support and define the outer cylindrical and end flange surfaces of ceramic matrix composite preform 12-12a during consolidation in the apparatus.

The various components of the apparatus are assembled around the preform by first positioning the carbon split liner segments around the composite preform and then inserting the liner and preform into the graphite mold. Thereafter, a solid cylinder of glass 18 together with a glass disk 18a are placed into the mold cavity formed by the preform and upper mold wall. These glass pieces together provide a glass charge of sufficient volume to form the desired softened glass pressure medium for the subsequent preform consolidation. Both glass pieces are formed of Corning Code 7740 borosilicate glass.

Following this assembly, a graphite plunger 22 having a diameter close to that of the inside diameter of graphite mold 16 is placed over glass disk 18a in the mold bore. The plunger has sufficient clearance in the mold to permit plunger travel in the bore. As shown in FIG. 2, this assembly is positioned beneath the piston 26 of a hydraulic pressure ram, not shown, which when actuated can apply force to graphite plunger 22 and thus to the charge of glass 18 and 18a within the bore of the preform.

To facilitate release of the composite preform 12-12a from the other components of the mold assembly, sheets of molybdenum foil of a thickness of 0.001 inches, not shown, are applied to inner and outer surfaces 12b and 12c of braided preform 12-12a which will be exposed to the split carbon mold or to the charge of pressurizing glass in the course of consolidation. In addition, to reduce flashing of the softened glass into the clearance between steel plunger 22 and the bore of mold 14, a refractory fibrous sealing material, for example a patch of fabric formed of the composite prepreg material of the preform, is used to provide a plunger liner 22a.

To consolidate the composite sample in the apparatus as described, the entire assembly is preheated in air in the low temperature section of the consolidation furnace of Example I to a temperature of approximately 450° C. over a time interval of about 20 minutes, and is then moved into the high temperature zone of the furnace for further heating under nitrogen to a consolidation temperature of 1000° C. At this temperature, the mold assembly is moved back into the 450° C. temperature zone and a force is applied to plunger 22 by hydraulic ram 26. This force is sufficient to achieve an internal hydraulic pressure of approximately 990 psi in softened glass charge 18-18a, which initially has a viscosity of about $10^6$ poises.

Pressure application is continued for about 5 minutes as the mold assembly gradually cools in the low temperature zone of the furnace. Thereafter, the pressure is released and the composite is annealed for approximately 20 minutes at 450° C. Finally, the assembly is removed from the furnace and disassembled, and the consolidated composite product resulting from the procedure is separated from the split liner and charge of pressurizing glass and examined.

Examination of the consolidated composite product indicates that a high degree of consolidation in both the cylinder and flange portions of the preform has been achieved. The product is substantially free of porosity and other defects or inclusions, having reached nearly theoretical density and exhibiting high toughness and strength. Thus it appears that hydrostatic pressure consolidation via the pressurizing medium of softened glass provides an effective procedure for the fabrication of complex composite products.

The successful consolidation of composite parts utilizing hydrostatic pressure as shown in the foregoing example requires care in the selection of the hydrostatic pressurizing medium. Desirably, the glass selected for this medium will have a substantial viscosity (on the order of at least $10^5$ poises) at the desired consolidation temperature. A viscosity of this approximate magnitude permits ready deformation and pressure transmission through the hot glass, yet is sufficiently high that excessive flash at the mold-plunger interface will be avoided. On the other hand, excessively high viscosity, e.g., in excess of about $10^8$ poises, can result in non-uniform pressurization of the preform and/or actual deformation of the preform due to drag by the softened glass pressurizing fluid.

Of course the selection of the glass to be used for a pressurizing fluid will depend on the optimum consolidation temperature for the particular ceramic matrix composite preform to be consolidated. In some instances, such as where glass-ceramic matrix materials are employed, the composites may be consolidated under isothermal conditions at temperatures as low as 850°-1000° C. However further heating to temperatures of 1340° C. or more may be needed for conversion of the matrix to a highly crystalline glass-ceramic.

At temperatures in excess of 1000° C., many common glasses are sufficiently low in viscosity that they will readily intrude into the plunger-mold wall interface if utilized as a pressurizing fluid in the procedure of Example II. High glass fluidity may also permit infiltration by the glass through any sealing or separation layers of refractory material provided on the preform surface during consolidation, thus risking contamination of the preform by the fluid glass.

A further aspect of the invention is a novel approach to the consolidation of high temperature materials by hydrostatic pressure forming which addresses the problem of providing a flatter viscosity/temperature characteristic in the pressurizing fluid. In accordance with that approach, the invention utilizes an inert refractory filler to increase the viscosity of the softened glass medium at high temperatures.

While any inert refractory filler material could be used to modify the viscosity/temperature characteristics of the softened glass medium, the preferred material for this process is particulate graphite. An example of a commercially available form of this material is flake graphite, sold by the Dixon Ticonderoga Company of Vero Beach, Fla. as Lubricating Graphite Flake No. 2. This material is relatively insoluble in and non-reactive with respect to softened glass, yet can be conveniently dispersed therein to increase the viscosity of the softened glass/filler system at high temperatures. The following example provides an illustration of the use of a filled softened glass pressurizing medium in accordance with this embodiment of the invention.

EXAMPLE III

A preform for a ceramic matrix composite article is first provided. The preform is a short cylinder consisting of a thin-walled ring of hollow cylindrical cross section, being formed of silicon carbide reinforcing fibers in a matrix of particulate glass which is convertible upon heat treatment to an alkaline earth aluminosilicate glass-ceramic matrix. The silicon carbide reinforcing fibers are derived from Nicalon NLM-202 silicon carbide fiber tow which is commercially available from the Nippon Carbon Company of Tokyo, Japan.

The preform to be consolidated is provided by winding silicon carbon fiber tows, which had first been impregnated as in Example I by immersion in a slurry of powdered glass, onto a cylindrical metal mandrel having a diameter of about 4.5 inches. The length or cylinder height of the cylindrical wound preform thus provided is about 2 inches. The powdered glass is a calcium aluminosilicate glass which can be converted into a dense glass-ceramic matrix material comprising anorthite crystals as the principal crystalline phase upon appropriate heat treatment.

Figure 3:
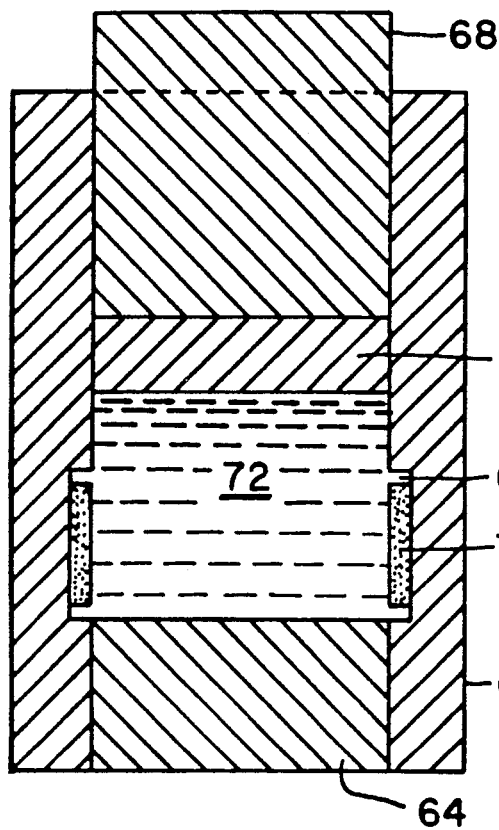
FIGS. 3 and 4 are schematic cross-sectional elevational views of alternative apparatus for composite consolidation using softened glass as the hydrostatic pressurizing medium.

The tooling utilized for the consolidation of this ring preform is schematically illustrated in FIG. 3 of the drawing. As shown in FIG. 3, a cylindrical ring mold 60 composed of graphite is provided, that mold having an annular cylindrical recess 62 cut into the inner wall to provide support for the ring preform during consolidation. Bottom and top plungers 64 and 66 composed of graphite are included in the mold assembly for contact with and force transmission to a hydrostatic pressure forming medium to be provided in the mold chamber. Force application is provided by piston 68 to which downward force is to be applied from a hydraulic pressure ram not shown.

The composite preform, shown as ring 70 in FIG. 3, is positioned within the annular recess in the molding chamber and a hydrostatic pressure forming medium 72 is introduced into the mold. Although shown as a pool of molten glass in FIG. 3, medium 72 is initially introduced as a blend of glass powder and graphite flakes wherein the glass constitutes 20 wt. % of the blend and the graphite particles the remainder. The preform and pressure medium are thereafter preliminarily heated to remove binders from the preform.

The top plunger 66 is then positioned over the powder blend and the piston 68 is fitted into the mold bore. The entire assembly is then positioned under a hydraulic ram in a hot-pressing furnace, and is heated to an initial consolidation temperature of about 850° C. During the latter stages of this heating, pressure is gradually applied to medium 72 via the hydraulic ram to achieve a final pressure of 2500 psi therein. Heating of the preform under pressure is then continued to the peak crystallization temperature of about 1340° C., and the preform is maintained under these conditions of heat and pressure for about 1.25 hours to complete the consolidation and crystallization process. Finally the pressure is released and the assembly is allowed to cool.

After the assembly has cooled, it is disassembled and the consolidated composite with pressurizing medium is removed from the mold cavity. The pressurizing medium is then separated from the consolidated composite, which is found to have reached a high degree of densification with full crystallization of the glass-ceramic matrix. Only minor intrusion of the blended glass pressurizing medium into the preform surface or plunger/mold interface is observed.

While the tooling shown in FIG. 3 is quite adequate for achieving good consolidation of a composite ring as described, the flow characteristics and particularly the lateral flow characteristics of the blended glass pressure medium are largely dominated by the graphite filler. There are some consolidation applications for which better lateral flow, without any requirement for overall viscosity reductions in the pressure medium, would be desirable.

Figure 4:
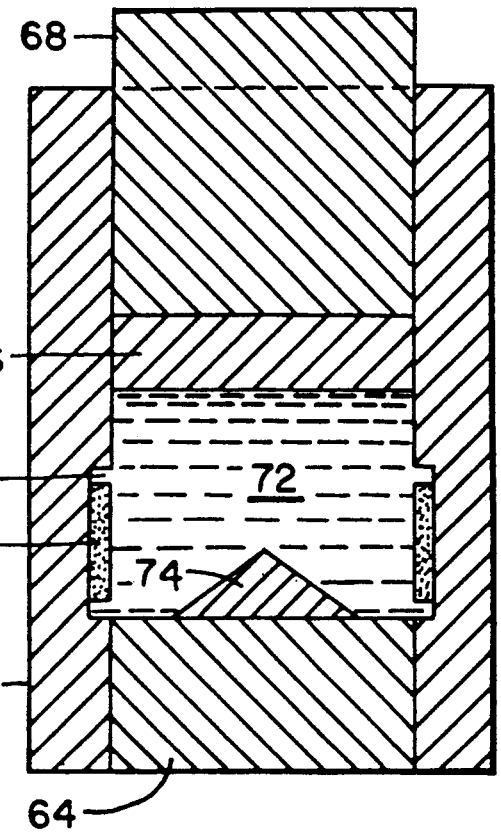

One way of achieving modified flow characteristics in the pressure medium is illustrated in FIG. 4 of the drawing. In FIG. 4, a flow deflector 74 has been introduced into the molding chamber of a consolidation assembly corresponding in all other respects to the assembly of FIG. 3. This deflector facilitates the flow of the pressurizing medium laterally in the molding chamber and thereby reduces the level of fluidity required in the glass pressurizing medium to achieve high lateral pressure on a composite ring preform in the chamber.

Of course, the amount of particulate present in the softened glass/filler pressurizing medium may be varied depending upon the thermal and flow characteristics required of the consolidation process. Thus filler concentrations may range from 0–80% by weight of particulates depending upon the flow characteristics desired.

Yet another preferred approach to the consolidation of composite preforms of complex configuration via pressurization by softened glass in accordance with the invention utilizes hot isostatic pressing (HIP) procedures. Such procedures are applicable both for glass diaphragm and glass hydrostatic pressure consolidation.

In the case of HIP processing involving hydrostatic glass pressurization as in Example II above, mechanical sources of consolidation force (e.g. piston 26 in FIG. 2) are replaced by flexible refractory metal HIP containers or "cans" into which mold and plunger sets containing preforms and charges of glass pressurizing material, such as shown in FIG. 2 are sealed. The application of isostatic pressure to these containers, which is transmitted by can deformation to the plunger(s) within the cans, then develops consolidation pressure within the softened glass pressurizing medium in the molds to consolidate the preforms therein. Since in this process the tool set is mechanically and isostatically confined, the risk of explosive depressurization in the event of a wall or joint failure in the pressurizing container is reduced.

Hot isostatic pressure consolidation can also be employed to great advantage utilizing a glass pressure membrane or envelope in a manner similar to that of Example 1. Apparatus suitable for carrying out such consolidation is schematically illustrated, not in true proportion or to scale, in the elevational cross-sectional drawing of FIG. 5.

Figure 5:
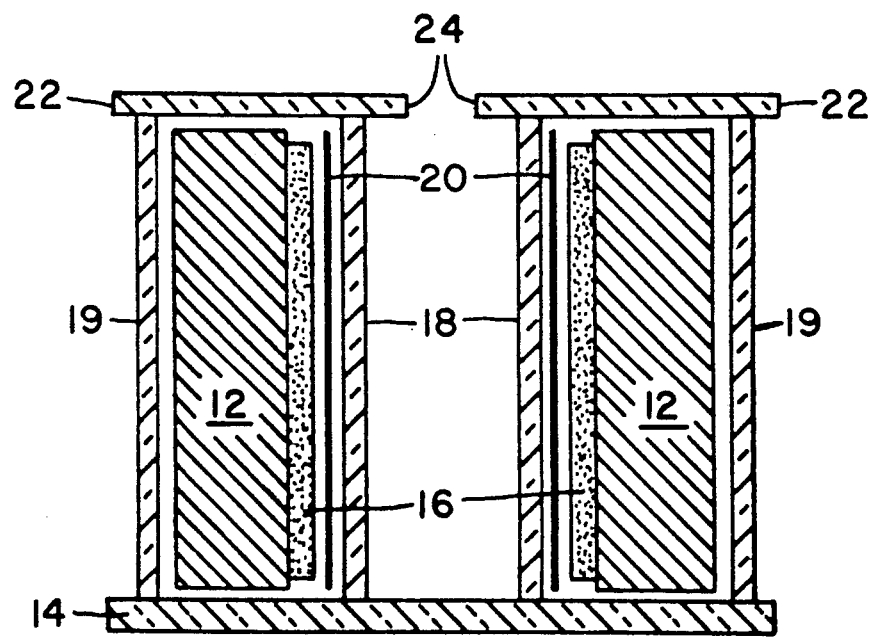
FIG. 5 is a schematic cross-sectional elevational view of glass envelope apparatus useful for carrying out hot isostatic pressure consolidation of a composite preform in accordance with the invention.

As shown in FIG. 5, a cylindrical composite preform 16 is positioned inside a cylindrical graphite mold 12, with both preform and mold being situated on circular borosilicate glass base plate 14. As in FIG. 1, a release layer 20 such as graphite paper sheet is provided on the interior or bore surface of preform 16 to serve as a release layer.

Two borosilicate glass cylinders 18 and 19 are positioned inside and outside, respectively, of the cylindrical mold/preform assembly to serve as interior and exterior pressure envelopes for the application of consolidation pressure to the preform and supporting mold. Top pressure sealing of the consolidation assembly is by means of circular borosilicate glass top plate 22 which is provided with center pressure vent opening 24. Together, the glass base plate, side cylinders and top plate form a closed annular chamber 26 containing the mold and preform to be consolidated.

An example illustrating the use of the apparatus of FIG. 5 for the HIP consolidation of a ceramic matrix composite article is as follows.

EXAMPLE IV

A cylindrical preform fabricated in accordance with the procedure disclosed in Example III, and utilizing the same fiber and matrix materials, is positioned on the glass base plate and within the cylindrical mold. A layer of graphite paper is then applied to the inner surface of the preform to serve as a release layer.

The assembly thus provided is next heated in a conventional furnace to about 550° C. to remove binders from the preform, and is then transferred to the pressure chamber of a hot isostatic press having provision for both vacuum and high pressure inert atmosphere processing. Thereafter, the inner and outer glass cylinders are placed over the preform/mold assembly, and the glass cover plate with center pressure vent is positioned over the entire assembly to form a closed chamber or "glass can" containing the preform and mold. The glass base plate, cover and cylinders are all composed of Corning Code 7740 borosilicate glass.

To carry out the consolidation procedure, the HIP pressure chamber is first closed, evacuated, and backfilled with argon to atmospheric pressure. The assembly is next preheated to about 400° C. under ambient pressure, after which a vacuum is drawn on the HIP chamber to effect the evacuation of the glass can assembly containing the preform and mold. The assembly is then heated under vacuum to about 950° C. to cause the sealing of the cylindrical glass sidewalls of the assembly to the glass top and bottom plates, thus forming a hermetically sealed glass envelope around the preform and supporting mold.

After sealing has been achieved, the vacuum is relieved and argon is introduced under pressure into the HIP chamber to achieve a chamber pressure of about 5000 psi. The preform and mold with sealed glass envelope are then heated under this pressure to a temperature of approximately 1340° C., and maintained under pressure at this temperature for about an hour. These conditions of heat and pressure are sufficient to achieve full consolidation of the preform and conversion of the glass matrix material to a dense anorthite glass-ceramic matrix.

Thereafter, the HIP chamber is allowed to cool as the pressure in the HIP chamber is released, and the consolidated glass-ceramic matrix composite is removed from the chamber and from the glass consolidation envelope. Excellent consolidation of the preform to full density, with substantially no shape distortion evident in the final form, are achieved by this process.

While the invention has been particularly described above with respect to specific materials and specific procedures, it will be recognized that those materials and procedures are presented for purposes of illustration only and are not intended to be limiting. Thus numerous modifications and variations upon the compositions, methods apparatus specifically described herein may be resorted to by those skilled in the art within the scope of the appended claims.

We claim:

1. A method for debulking and consolidating a porous preform for a fiber-reinforced ceramic matrix composite article to minimize fiber buckling and ply wrinkling in the composite article, the porous preform comprising a combination of long reinforcing fibers with a finely-divided ceramic matrix material, which comprises the steps of:

heating the preform to a consolidation temperature in the range of about 500°–150° C., and applying consolidation pressure to the porous preform through a softened glass pressurizing medium while supporting the preform against a rigid shaping surface for the preform, said consolidation pressure being applied in a direction normal to the prevailing directions of the long reinforcing fibers in the preform and while said softened glass pressurizing medium has a viscosity of at least about $10^4$ poises.

2. A method in accordance with claim 1 wherein the softened glass pressure medium is provided as a glass diaphragm at least partially encasing the preform.

3. A method in accordance with claim 1 wherein the softened glass medium is provided as a body of pressurizing fluid within a pressurized chamber containing the preform.

4. A method in accordance with claim 2 wherein a compressed gas is utilized to apply the consolidation force to the glass diaphragm.

5. A method in accordance with claim 4 wherein the glass diaphragm is a closed glass envelope encasing both the preform and the solid supporting means.

6. A method in accordance with claim 5 wherein consolidation pressure is applied to the closed glass envelope by hot isostatic pressing.

7. A method in accordance with claim 1 wherein, prior to consolidation, the exterior surface of the porous preform is at least partially covered with at least one thin flexible separation layer composed of a material compatible with softened glass.

8. A method in accordance with claim 7 wherein the separation layer is composed of a material selected from the group consisting of molybdenum foil and graphite sheet.

9. A method in accordance with claim 3 wherein mechanical piston means are utilized to apply the consolidation force to the softened glass medium.

10. A method in accordance with claim 3 wherein the softened glass medium includes a refractory filler in a proportion at least effective to increase the high temperature viscosity thereof.

11. A method in accordance with claim 10 wherein the refractory filler is flaked graphite.

* * * * *